United States Patent [19]
Kenyon et al.

[11] 3,961,569
[45] June 8, 1976

[54] APPARATUS FOR CONTINUOUS MICROWAVE STERILIZATION OF FOOD IN POUCHES

[75] Inventors: Ernest M. Kenyon, Medfield; Daniel Berkowitz, Wellesley; John A. Ayoub, Dedham, all of Mass.

[73] Assignee: The United States of America as represented by the Secretary of the Army, Washington, D.C.

[22] Filed: Aug. 15, 1974

[21] Appl. No.: 497,789

[52] U.S. Cl. ............................ 99/451; 99/443 C; 99/470; 99/483; 219/10.55 A
[51] Int. Cl.² ................. A23L 3/04; A23L 3/32; H05B 9/00
[58] Field of Search .......... 219/10.55 A, 10.55 E; 21/54 R, 102 R; 99/349, 355, 360, 361, 362, 443 R, 443 C, 451, 470, 483; 198/184, 193

[56] References Cited
UNITED STATES PATENTS

| 3,261,140 | 7/1966 | Long et al. | 219/10.55 A |
|---|---|---|---|
| 3,427,171 | 2/1969 | Jeppson | 219/10.55 A X |
| 3,525,840 | 8/1970 | Dremann | 219/10.55 A |
| 3,528,361 | 9/1970 | Le Van | 99/349 |
| 3,535,483 | 10/1970 | Puschner | 219/10.55 A |
| 3,539,751 | 11/1970 | Levinson | 219/10.55 E |
| 3,581,652 | 6/1971 | Chauvin | 99/349 X |
| 3,718,082 | 2/1973 | Lipoma | 99/470 |

FOREIGN PATENTS OR APPLICATIONS

| 987,904 | 8/1965 | United Kingdom | 198/193 |
|---|---|---|---|
| 750,356 | 9/1956 | United Kingdom | 198/193 |

*Primary Examiner*—Billy J. Wilhite
*Assistant Examiner*—James A. Niegowski
*Attorney, Agent, or Firm*—Nathan Edelberg; Robert P. Gibson; Charles C. Rainey

[57] ABSTRACT

An apparatus for sterilizing food packaged in flexible pouches in a continuous process employing microwaves for heating the food within the sealed flexible pouches to sterilizing temperatures. The pouches of food are conveyed thru the apparatus between a pair of conveyor belts which are permeable to microwaves and which comprise a layer of thermal insulation which is also permeable to microwaves. The pouches are also permeable to microwaves. The apparatus is pressurized to prevent bursting of the flexible pouches at the high sterilizing temperatures attained.

4 Claims, 3 Drawing Figures

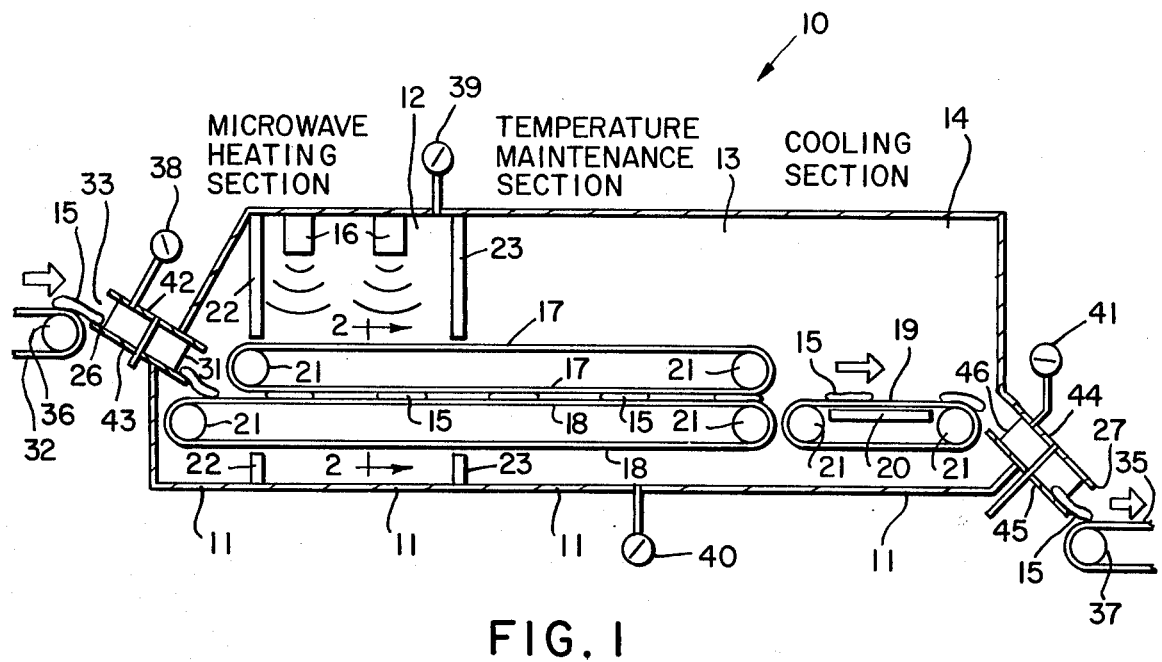
FIG. 1
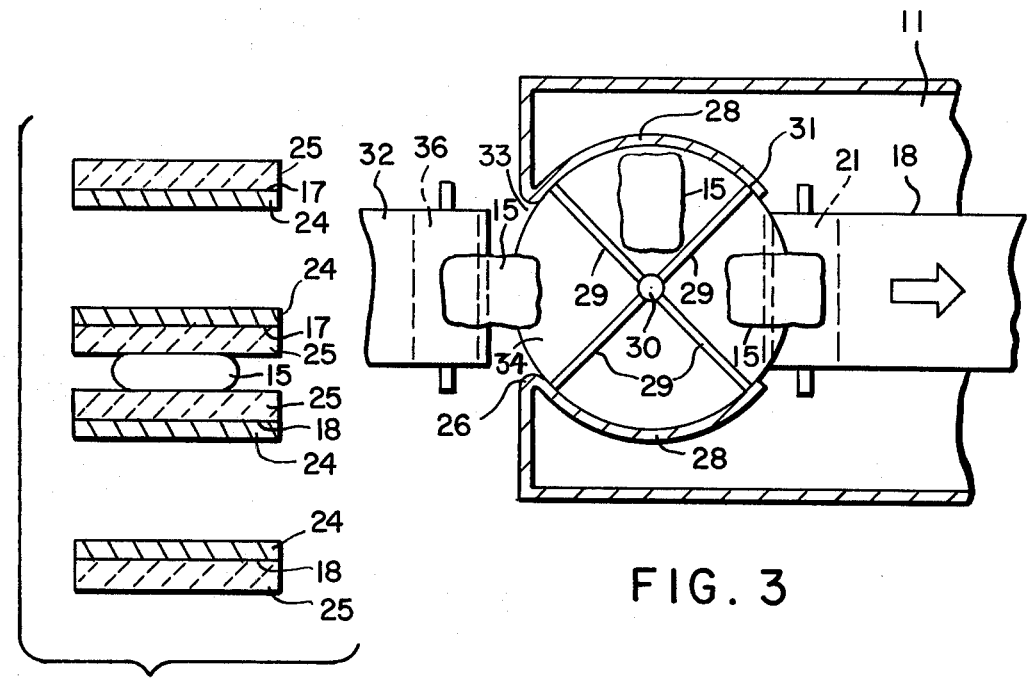
FIG. 2
FIG. 3

APPARATUS FOR CONTINUOUS MICROWAVE STERILIZATION OF FOOD IN POUCHES

The invention described herein may be manufactured, used, and licensed by or for the Government for governmental purposes without the payment to us of any royalty thereon.

BACKGROUND OF THE INVENTION

This invention relates to an apparatus for the sterilizing of flexibly packaged food items in a continuous process in which microwaves are used to heat the items to sterilizing temperatures.

Food, which is to be sterilized in an apparatus in accordance with the invention, preferably is hermetically sealed in pouches or similar containers made of non-metallic materials which are transparent or permeable to microwaves and which will effectively exclude infiltration of microorganisms into the food over a time period of several years. Such packaging materials are available in today's commercial market in numerous forms of polymeric films, including laminates of two or more such films. For example, polyethylene, polypropylene, polyethylene terephthalate, and numerous other polymeric films are available for such purposes and do a good job of protecting food packaged therein against recontamination after it has been sterilized in a sealed package.

Sterilization of packaged foods in containers which are transparent to microwaves is well-known in the art as illustrated by U.S. Pat. No. 3,718,082, which relates to continuous microwave heating of sealed or unsealed packages of food being conveyed through a microwave apparatus on a single conveyor belt. However, this system has the disadvantage that the heat generated within the packaged food is lost from the food at a rapid rate, thus requiring the input of much more microwave energy to increase the temperature of the food to a sterilizing level and to maintain it at such a level than would be required if means were provided for preventing loss of the thermal energy from the food until sterilization is complete.

It is, therefore, an object of the invention to provide apparatus for thermally processing a food hermetically sealed in a plurality of flexible packages intended for long-term storage of the food, the thermal processing to be accomplished by microwave irradiation of the plurality of flexible packages continuously and by maintaining in the food substantially all of the heat generated therein by the microwaves until the food has become sterilized, and thereafter cooling the packages of sterilized food to a temperature low enough to prevent bursting of the packages prior to discharge of the packages of sterilized food from the apparatus into the external atmosphere.

Another object of the invention is to provide apparatus for sterilizing food in sealed flexible pouches continuously with microwaves in a shorter time than has heretofore been possible for a given input of microwave energy.

A further object of the invention is to provide apparatus for sterilizing food in sealed flexible pouches continuously with microwaves at a substantially reduced processing cost.

Other objects and advantages will be apparent from the following description of the invention, and the novel features will be particularly pointed out hereinafter in connection with the appended claims.

SUMMARY OF THE INVENTION

The objects of the invention are accomplished by providing an apparatus comprising two parallel, spaced apart, conveyor belts for conveying sealed, flexible packages of food through a microwave heating section and a temperature maintenance section of a microwave processing tunnel, one or both of the conveyor belts being constructed of materials which are permeable, i.e., transparent, to microwaves. The two conveyor belts are spaced apart just enough for the flexible packages of food to be in closefitting contact with both of the conveyor belts between which the packages are conveyed through the microwave processing tunnel. Either or both of the conveyor belts may and preferably will have a layer of heat insulation material, such as a foamed polymeric material, applied over the surface thereof which faces the packages. Even without such layers of heat insulation material, however, the conveyor belts tend to hold the heat within the flexible packages of food and thus bring about a more rapid attainment of sterilizing temperatures than would be the case if only the conveyor belt on which the packages lie as they are conveyed through the microwave processing tunnel were employed. Furthermore, after a certain amount of microwave energy is absorbed by the packages of food and the temperature of the food is raised to as high a value as is desired, this temperature is substantially maintained as the packages progress through the temperature maintenance section without any further exposure to microwaves because of the thermal insulation provided to the packages of food by the two conveyor belts. At least one of the conveyor belts and its layer of heat-insulating material, if it has one, must be permeable to microwaves to be effective since the microwave energy must penetrate the food inside of the packages in order to generate sufficient heat therein to sterilize the food. In general, if both of the conveyor belts and their layers of insulation material, in case they have such layers of insulation material, are transparent to microwaves, the flexible packages of food will be heated to sterilizing temperatures appreciably more rapidly than if only one conveyor belt and its layer of insulation material, if any, are transparent to microwaves.

Since temperatures required for sterilization of food are appreciably above the boiling point of water at atmospheric pressure, an overpressure, preferably of from about 25 to about 40 p.s.i.g., is applied to the interior of the microwave processing tunnel, which is sufficient to prevent bursting of the flexible package material at the rates of throughput of the pouches of food usually employed.

DESCRIPTION OF THE PREFERRED EMBODIMENT

The drawing shows the preferred embodiment of the invention.

In the drawing:

FIG. 1 is a somewhat diagrammatic view in side elevation and partially in section of an apparatus embodying the principles of the invention.

FIG. 2 is a vertical sectional view of the heat-insulated conveyor belts of the apparatus of FIG. 1 taken thru a plane represented by the line 2—2.

FIG. 3 is a somewhat diagrammatic, partly cross-sectional view of an airlock means for introducing flexible pouches of food into the pressurized tunnel wherein the pouches of food are irradiated with microwaves while passing thru the tunnel under a predetermined pressure. FIG. 3 also shows the end portion of the lower one of the two conveyor belts between which the pouches of food are conveyed thru the pressurized tunnel to effect sterilization of the food. The airlock is shown broken away from the tunnel portion of the apparatus.

Referring to the drawing, wherein like reference characters designate like parts in all views, 10 designates generally the apparatus for sterilizing food sealed in flexible, microwave-permeable pouches in accordance with the invention. The apparatus includes a pressurized tunnel 11 the interior of which is maintained under controlled but variable superatmospheric pressure, preferably of from about 25 to about 40 p.s.i.g., by means of equipment not shown in the drawing, to prevent bursting of the pouches of food at sterilizing temperatures. The pressurized tunnel comprises three sections, a microwave heating section 12, a temperature maintenance section 13, and a cooling section 14. Hermetically sealed pouches 15 containing food to be sterilized to permit long-term storage thereof without refrigeration are conveyed in the direction indicated by the arrows thru the pressurized tunnel wherein the pouches, which are made of microwave-permeable material, are exposed to microwaves in the microwave heating section to generate sufficient heat in the food to raise the temperature thereof to a sufficiently high level to destroy substantially all of the microorganisms in the food if the irradiated food is maintained at such a temperature for a sufficient length of time for the purpose. The microwave-permeable material of which the pouches are made may be selected from a wide variety of polymeric materials and may be a laminate of two or more such materials. A type of pouch-forming material which has been found to be particularly suitable for use with the apparatus of the invention is a laminate of 3 mil thick non-oriented polypropylene and 0.05 mil thick polyethylene terephthalate. The pouches of food heated to the desired temperature to produce sterilization are conveyed from the microwave heating section through the temperature maintenance section wherein the food is maintained at a sterilizing temperature until sterilization is complete. The pouches of food are then conveyed through the cooling section where they are cooled sufficiently to prevent bursting of the pouches when they are discharged from the pressurized tunnel into the external atmosphere.

The interior of the microwave heating section is provided with microwaves emanating from one or more sources 16 of microwave energy of a frequency which has been approved for commercial use and is desired for heating the pouches of food. If desirable, more than one frequency of microwaves may be employed by providing a different source for each different frequency.

To provide for the conveying of the pouches of food thru the microwave heating section and the temperature maintenance section two parallel, spaced apart, heat-insulated, endless conveyor belts made of microwavepermeable materials are arranged within the pressurized tunnel with one of the conveyor belts designated as upper conveyor belt 17 positioned above the other of the conveyor belts designated as lower conveyor belt 18 and spaced from said lower conveyor belt a distance which is about equal to the thickness of the pouches of food. This arrangement enables a plurality of pouches of food which is to be sterilized to be conveyed through the microwave heating section and the temperature maintenance section between the two microwave-permeable conveyor belts with the conveyor belts closely adjacent to the pouches of food both above and below them. Thus, as the pouches of food are conveyed thru the microwave heating section, the microwaves pass through the microwave-permeable conveyor belts and the microwave-permeable pouch material into the food where they are absorbed and converted into thermal energy, the temperature of the food being rapidly increased to the temperature required for sterilization of the food. The two conveyor belts, preferably being thermally insulated, tend to hold the heat within the pouches of food. The pressurization of the tunnel prevents the bursting of the pouches due to steam pressure built up therein by the heat generated from the microwave energy absorbed by the food. The conveyor belts continue to insulate the pouches of food as they pass through the temperature maintenance section. The speed of the conveyor belts and the rate of input of microwave energy are adjusted in accordance with the ability of the conveyor belts to cause heat to be retained in the pouches of food so that, by the time the pouches reach the end of the temperature maintenance section, the food is sterilized. The pouches pass across a narrow gap between the ends of the upper and lower conveyor belts 17 and 18 and a third conveyor belt 19 onto conveyor belt 19, which is located in the cooling section of the tunnel. The cooling section is also maintained pressurized at the same pressure as the other sections of the tunnel so that there will be no danger of the pouches bursting before they have had an opportunity to cool sufficiently in the cooling section not to burst when discharged into the external atmosphere. The third conveyor belt 19 is preferably made of metal to render it more heat-conductive and is cooled by means of a refrigerated platen 20 located directly beneath the portion of conveyor belt 19 on which the pouches of food are conveyed through the cooling section. There is no need for an upper conveyor belt in the cooling section as in the microwave heating section and the temperature maintenance section since there is no need to thermally insulate the pouches of food as they pass through the cooling section.

The apparatus of the invention also comprises a plurality of rotatable drums 21 which drive the various conveyor belts. The rotational speeds of these drums may be varied as desired to control the surface speeds of the several conveyor belts in order to control the speeds at which the pouches are conveyed thru the several sections of the apparatus.

The microwave heating section is provided with a safety water jacket 22 near the entrance end thereof and another safety water jacket 23 between it and the temperature maintenance section to absorb any microwaves which may not be absorbed by the pouches of food and which otherwise might escape from the microwave heating section and create hazardous conditions for the operator or other persons in the vicinity of the apparatus. Just enough of an opening through each of the safety water jackets is provided to accommodate the two conveyor belts and the pouches of food being conveyed therebetween thru the microwave heating section and the temperature maintenance section. Water is circulated through the safety water jackets as needed to prevent leakage of microwaves from the apparatus.

As stated above, FIG. 2 provides a vertical sectional view of the heat-insulated conveyor belts. It also shows a pouch of food in relation to conveyor belts 17 and 18 while it is being conveyed through the microwave heating section. The close-fitting relationship of pouch 15 to conveyor belts 17 and 18 is important for the retention of heat in the pouches of food through the temperature maintenance section. Each of the conveyor belts 17 and 18 is constructed of a base layer 24, which is relatively strong, and a heat insulation layer 25, which may be but is not necessarily relatively weak since it is supported by the base layer. The base layer may be made of glass fiber bonded with silicone rubber or other high polymers, such as polytetrafluoroethylene, polypropylene, or high melting polyethylene. The base layer of at least one of the conveyor belts 17 and 18 must be permeable to microwaves and it is preferred that the base layer of both of these conveyor belts be permeable to microwaves. The heat insulation layer may be made of any low loss thermal insulation material. Foamable polymeric materials which do not melt at the temperature attained by the pouches containing the food being sterilized have been found to be suitable for the purpose. Foamed polyethylene or foamed polypropylene are particularly useful as the heat insulation layer. If only one of the two conveyor belts 17 and 18 is permeable to microwaves, any layer of heat insulation associated therewith must also be permeable to microwaves. It is preferable for the heat insulation layer on both of conveyor belts 17 and 18, as well as the base layers of the conveyor belts, to be permeable to microwaves to provide the maximum rate of absorption by the pouches of food of the microwaves being fed into the microwave heating section.

It has been found possible to dispense with the heat insulation layers on the conveyor belts, although such an arrangement will not be as efficient in maintaining within the pouches of food the heat generated from the microwaves absorbed by the food as when the conveyor belts 17 and 18 have heat insulation layers thereon. The heat insulation layers make possible operation of the conveyor belts 17 and 18 at faster speeds and thus permit a faster rate of sterilization of the pouches of food because of the more rapid increase in the temperature of the pouches of food and the more effective maintenance of the temperature as the pouches progress through the temperature maintenance section under these conditions compared with the increase in temperature and maintenance of temperature by the pouches of food when the conveyor belts 17 and 18 do not have heat insulation layers thereon.

The pouches of food are fed into the pressurized tunnel through entrance airlock 26, shown in cross-section in FIG. 3 and removed from the pressurized tunnel, after being cooled in the cooling section sufficiently to prevent bursting of the pouches, through exit airlock 27, which is constructed similarly to the entrance airlock. The two airlocks minimize loss of air pressure or other gas pressure within the pressurized tunnel due to passage of the pouches into and out of the tunnel. As shown in FIG. 3, the entrance airlock is constructed and operates much like a revolving door, having two opposed nearly semi-circular walls 28 within which four door elements 29 attached to a central axle 30 rotate while fitting snugly along their outer edges 31 against the inner surfaces of the nearly semi-circular walls. The rotation of the four door elements permits the feeding of the pouches of food one at a time from a feed conveyor belt 32 through entrance opening 33 into a compartment 34 between two of the door elements from which point rotation of the four door elements 29 of the entrance airlock carries the pouch of food into the pressurized tunnel while maintaining an effective seal of the pressurized tunnel at all times. When the pouch of food reaches a position in line with the lower conveyor belt 18 in the pressurized tunnel, the pouch slides out of the compartment between the two door elements of the airlock onto conveyor belt 18 and is conveyed through the microwave heating section and the temperature maintenance section between conveyor belts 17 and 18, then through the cooling section on third conveyor belt 19 from which it is introduced into exit airlock 27 and passes out of the pressurized tunnel in substantially the same manner as that by which it was introduced into the pressurized tunnel, the pouch being discharged from the exit airlock onto removal conveyor belt 35 to be conveyed thereby to a packaging zone, not shown, or other area for further handling or use of the pouch of sterilized food. Numerals 36 and 37 represent rotatable drums which drive feed conveyor belt 32 and removal conveyor belt 35, respectively.

The apparatus is provided with pressure gauges at a number of points so that the operator of the apparatus can be constantly aware of the pressure within the system at various strategic locations. Pressure gauge 38 is connected to the interior of entrance airlock 26. Pressure gauge 39 connects with the interior of the microwave heating section. Pressure gauge 40 connects with the interior of the temperature maintenance section. Pressure gauge 41 connects with the interior of exit airlock 27.

Entrance airlock 26 is provided with a top plate 42 and a base plate 43 to maintain a close-fitting relation to the door elements 29 so that at all times at least two of the compartments of the entrance airlock are in communication with the microwave heating section and are substantially sealed from the external atmosphere. Likewise exit airlock 27 is provided with a top plate 44 and a base plate 45 to maintain a close-fitting relation to the door elements 46 of the exit airlock so that at all times at least two of the compartments of the exit airlock are in communication with the cooling section and are substantially sealed from the external atmosphere.

The apparatus of the invention has been described in terms of its use in the sterilization of foods enclosed in sealed flexible pouches. However, this is only one of many potential uses for the apparatus. Other materials than foods may be sterilized by means of the apparatus. Also, if it is desired merely to heat food or other lossy materials that are not sealed in flexible packages, this may be done using open containers or packages for the food or other material. It may not be possible to attain as high a temperature in the food or other material as when the flexible packaging material is sealed, but this may not be essential, particularly if a food is simply being rewarmed prior to being consumed.

The apparatus of the invention makes possible a more efficient sterilization process for flexibly packaged foods in terms of speed of processing the foods and a less expensive sterilization process since less microwave energy is required per flexible pouch of food and more pouches of food can be sterilized per unit of time than in prior microwave sterilization processes where the pouches were conveyed on a single conveyor belt without being insulated against loss of heat developed in the food within the pouches. The apparatus also eliminates the need for auxiliary heating with steam or heated air in conjunction with microwaves, which procedure has been carried out heretofore, since the heat generated within the food is maintained as long as it is needed for sterilizing purposes in the apparatus of the invention.

It will be understood that various changes in the details, materials and arrangements of parts which have been herein described and illustrated in order to explain the nature of the invention, may be made by those skilled in the art within the principle and scope of the invention.

We claim:

1. Apparatus for sterilizing food sealed in flexible, microwave-permeable pouches, including in combination:

a tunnel pressurized above atmospheric pressure comprising a microwave heating section, a temperature maintenance section, and a cooling section, said microwave heating section having a source of microwaves for heating said food to sterilizing temperatures, said temperature maintenance section comprising a space wherein said food sealed in said flexible, microwave-permeable pouches is maintained at said sterilizing temperatures after said food passes out of said microwave heating section for a length of time sufficient to accomplish sterilization of said food, said cooling section having means for reducing the temperature of said food after sterilization thereof sufficiently to prevent bursting of said pouches when exposed to the atmosphere outside of said pressurized tunnel, means for introducing said flexible, microwave-permeable pouches into said pressurized tunnel at an entrance end thereof while an atmosphere of predetermined pressure above atmospheric pressure is maintained within said pressurized tunnel, means for removing said pouches from said pressurized tunnel at an exit end thereof while an atmosphere of predetermined pressure above atmospheric pressure is maintained within said pressurized tunnel, two parallel, spaced apart, heat-insulated, endless conveyor belts, one of said conveyor belts being positioned above the other of said conveyor belts and spaced from said other conveyor belt a distance which is substantially equal to the thickness of said flexible pouches of food, said conveyor belts being contained within said microwave heating section and said temperature maintenance section of said pressurized tunnel, at least one of said two parallel, spaced apart, heat-insulated, endless conveyor belts being microwave-permeable, a third endless conveyor belt contained within said cooling section of said pressurized tunnel, means for driving each of said endless conveyor belts, said two parallel, spaced apart, heat-insulated, endless conveyor belts being adapted to receive said flexible pouches of food from said introducing means and to convey said flexible pouches of food therebetween through said microwave heating section and said temperature maintenance section of said pressurized tunnel and to deposit said flexible pouches of food in succession onto said third endless conveyor belt, said third endless conveyor belt being adapted to receive said flexible pouches of food from said two parallel, spaced apart, heat-insulated, endless conveyor belts and to convey said flexible pouches of food through said cooling section of said pressurized tunnel and to discharge said flexible pouches of food from said cooling section into said removing means;

whereby said food sealed in said flexible pouches is irradiated by said microwaves while said pouches are being conveyed through said microwave heating section, said food being heated by said microwaves to temperatures effective for sterilizing said food, at which temperatures said pouches are held while being conveyed through said temperature maintenance section wherein said food becomes sterilized, said flexible pouches of food thereafter being cooled while being conveyed through said cooling section sufficiently to prevent bursting of said pouches when exposed to the atmosphere outside of said pressurized tunnel, said flexible pouches of food being discharged from said third conveyor belt into said removing means and thereafter being discharged from said removing means into the atmosphere outside of said pressurized tunnel in a sterilized condition.

2. Apparatus according to claim 1, wherein said introducing means is an airlock comprising a plurality of compartments isolated from each other for receiving, holding for a predetermined period of time, and then discharging pouches of food one at a time as said pouches of food are being introduced from the outside atmosphere into said pressurized tunnel at said entrance end thereof, and said removing means is an airlock comprising a plurality of compartments isolated from each other for receiving, holding for a predetermined period of time, and then discharging pouches of sterilized food one at a time as said pouches of sterilized food are being removed from said pressurized tunnel at said exit end thereof into the outside atmosphere.

3. Apparatus according to claim 1, wherein both of said two parallel, spaced apart, heat-insulated, endless conveyor belts are microwave-permeable.

4. Apparatus according to claim 3, wherein both of said two parallel, spaced apart, heat-insulated, endless conveyor belts comprise a layer of microwave-permeable, foamed polymeric heat insulation.

* * * * *